(12) United States Patent
Fabre et al.

(10) Patent No.: US 8,727,263 B2
(45) Date of Patent: May 20, 2014

(54) METHOD AND DEVICE FOR AIDING THE LOCALIZATION OF AN AIRCRAFT WRECK SUBMERGED IN A SEA

(75) Inventors: Christian Fabre, Tournefeuille (FR); Alain Bignolais, Leguevin (FR)

(73) Assignee: Airbus Operations (SAS), Toulouse Cedex (FR)

( * ) Notice: Subject to any disclaimer, the term of this patent is extended or adjusted under 35 U.S.C. 154(b) by 219 days.

(21) Appl. No.: 13/310,873

(22) Filed: Dec. 5, 2011

(65) Prior Publication Data
US 2012/0138741 A1 Jun. 7, 2012

(30) Foreign Application Priority Data

Dec. 6, 2010 (FR) ...................................... 10 60115

(51) Int. Cl.
*B63B 22/00* (2006.01)
(52) U.S. Cl.
USPC .......................................................... 244/1 R
(58) Field of Classification Search
CPC ............................... G08B 5/002; B63B 22/003
USPC ........................................................ 244/1 R
See application file for complete search history.

(56) References Cited

U.S. PATENT DOCUMENTS

| 2,470,783 | A | * | 5/1949 | Mead | 441/8 |
| 4,433,638 | A | * | 2/1984 | Ashline | 116/210 |
| 4,619,066 | A | * | 10/1986 | Kirkland et al. | 43/25 |
| 5,838,275 | A | * | 11/1998 | Carmi | 342/8 |
| 6,032,607 | A | * | 3/2000 | Ashline | 116/210 |
| 6,260,508 | B1 | * | 7/2001 | Morse | 116/211 |
| 8,493,715 | B1 | * | 7/2013 | Angelucci | 361/679.01 |

FOREIGN PATENT DOCUMENTS

WO   2011067334   6/2011

OTHER PUBLICATIONS

French Patent Office, French Search Report FR 1060115, Aug. 22, 2011 (2 pgs).

* cited by examiner

*Primary Examiner* — Tien Dinh
*Assistant Examiner* — Justin Benedik
(74) *Attorney, Agent, or Firm* — Wood, Herron & Evans, LLP

(57) ABSTRACT

A device for aiding the localization of an aircraft wreck submerged in a sea is arranged inside the aircraft. The device includes at least one beacon that is able to emit remotely detectable signals. Upon immersion of the aircraft in water, an ejection device automatically ejects the beacon out of the aircraft. The ejection device includes a piston system that generates an opening in the aircraft and expels the beacon accordingly. Also after immersion of the aircraft in water, a trigger device automatically triggers the emission of signals from the beacon.

14 Claims, 4 Drawing Sheets

METHOD AND DEVICE FOR AIDING THE LOCALIZATION OF AN AIRCRAFT WRECK SUBMERGED IN A SEA

TECHNICAL FIELD

The present invention relates to a method and a device for aiding the localization of an aircraft wreck, in particular of a transport airplane, being submerged in a sea water expanse, such as a sea or an ocean, including as a result of a crash.

BACKGROUND

It is known that, through legal rules, emergency beacons are installed on aircrafts, so as to allow, in the case of a crash, a detection of the wreck by rescue teams, and the recovery of what is commonly referred to as flight recorders.

These flight recorders are used on aircrafts for recording the main information linked to the flight. Their analysis carried out a posteriori after an incident or an accident should allow determining the causes thereof. There are two types of flight recorders:
- a conversation recorder in the cockpit, of the Cockpit Voice Recorder ("CVR") type, recording ground-board conversations, but also conversations between the crew members in the cockpit; and
- a digital flight data recorder, of the Digital Flight Data Recorder ("DFDR") type, recording flight technical data, such as the trajectory, the altitude, the attitude, the speed, etc.

The evolution of the technologies and the miniaturization now make it possible to achieve combined (DFDR and CVR) recorders that should result, in a near future, in the associated rules being modified. The number of parameters being recorded depends on the characteristics of the flight recorder. While twenty-eight parameters represent generally the minimum being required, most recent airplanes could be provided with flight recorders able to record up to one thousand three hundred data.

These two flight recorders are generally installed at the rear of the aircraft, in an area being in principle the least exposed one upon an impact with the ground or with a water surface. Moreover, they are designed so as not to be destroyed during an air crash. The recorded data are protected by three layers of materials, intended for ensuring their survival to shocks, to a fire and/or to a deep immersion.

Each flight recorder is additionally provided with a beacon, of the Underwater Locator Beacon ("ULB") type, automatically triggering upon a crash of the aircraft on a solid or liquid surface and emitting, every second and for a minimum period of time of 30 days, an omnidirectional ultrasound signal at a frequency of 37.5 kHz at 160 dB, so as to aid the localization of the aircraft. This signal is able to be detected as down to a depth of about 6000 meters, via in particular the use of specific passive hydrophones, being towed behind rescue ships deployed on the area of the accident.

However, if the crashed aircraft is submerged in an area where the sea ground is very rough, or if it is deeply burned in a free-flowing ground or even if important metallic elements are present in the area being considered, it is possible that the detection by the rescue teams of the signals emitted by the emergency beacon is extremely difficult, or even nearly impossible. This is a real problem for the air companies, the aircraft manufacturers and still more for the families of the victims of the accident.

The present invention aims at solving these drawbacks. It relates to a device for automatically aiding the localization of a wreck of an aircraft, in particular of a transport airplane, being submerged in a sea water expanse (sea or ocean), including as a result of a crash.

SUMMARY OF THE INVENTION

To this end, according to the invention, said device of the type comprising at least one beacon being able to emit signals able to be detected remotely and being installed inside the aircraft, is remarkable in that it further comprises means for automatically ejecting said beacon being floating out of the fuselage of the aircraft, upon an immersion of the latter, as well as means for automatically triggering the emission of said signals after said ejection.

Thus, thanks to the invention, during or just after the impact with the surface, during the immersion phase, the beacon is ejected out of the fuselage of the aircraft. Moreover, as this beacon is floating, it goes up in the direction of the surface above the wreck of the aircraft, allowing to facilitate the detection of the signals that it then emits and thereby to aid the localization of the wreck.

Consequently, the device according to this invention is a device for emitting emergency signals, to be installed on the aircraft in addition to the already existing devices and allowing to very significantly increase the probability of detection of a wreck submerged as a result of an accident above the sea field.

In a first embodiment, the device according to this invention comprises means for releasing completely the beacon of the aircraft after its ejection out of the fuselage upon an immersion, so that after its ejection, it goes up directly to the surface where it could be more easily detected and located.

In a second embodiment, said device further comprises linking means, preferably a cable or a halyard, for maintaining the beacon, at least temporarily, linked to the aircraft, after its ejection out of the fuselage upon an immersion.

Thus, when the aircraft lies on the bottom of the sea water expanse, the beacon being always linked to the structure of the aircraft floats, above the aircraft, at a distance from the latter depending on the length of the ties (or halyard) being used. When the depth at which the aircraft lies is high, releasing the emitting beacon from the bottom of the water expanse, for instance by a few hundreds of meters, allows to strongly enhance the probability of detection, as it is then not trapped in the metallic fuselage of the aircraft, able to significantly decrease the efficiency of the emergency signal, and this more particularly if the fuselage is buried in a free flowing ground or if the local relief is very rough.

In a particular embodiment, said device further comprises means for detecting an immersion (including as a result of a crash), and said ejection means eject the beacon out of the fuselage, upon the detection of an immersion by said detection means.

Moreover, in a particular embodiment, said detection means comprise means for measuring the current values of at least one parameter relative to the aircraft or to its environment, for instance the altitude or the surrounding pressure linked to an immersion of the aircraft, and means for comparing the measured current values to a threshold value, an immersion being detected when a measured current value exceeds said threshold value, and this for instance for a predetermined period of time.

Moreover, advantageously, said ejection means comprise means for generating an opening in the fuselage and means for expelling said beacon out of the aircraft thru said opening, comprising preferably a piston system, as set forth below. In a preferred embodiment, said piston is hollow so as to be provided with an internal casing, wherein there are arranged said beacon (when it is installed inside the aircraft) and if applicable a halyard.

For implementing the present invention different types of beacons could be used, and including:

an underwater emergency radio-beacon of the ULB type, allowing to emit an underwater signal, but requiring for its detection the presence of ships (boats or submarines) provided with sounders at a relative vicinity;

an emergency locator transmitter, of the Emergency Locator Transmitter ("ELT") type, only emitting on the surface and allowing for a very accurate record of a geographic position, by means of a COSPAS-SARSAT network it uses as soon as it is triggered.

In a preferred embodiment, for increasing its efficiency, the present invention uses at least two floating beacons, and preferably two floating beacons being differently implemented. As an example, it could use:

two beacons of the ULB type, at least one of them remains linked to the aircraft via a halyard, preferably made in an aramid fiber, with a length able to reach several hundreds of meters. The halyard spreads as the aircraft dips in the deep sea, whereas the beacon tends to go up to the surface, due to the floatability thereof;

one beacon of the ULB type and one beacon of ELT type. The ULB beacon remains linked to the structure of the aircraft, whereas the ELT beacon goes up to the surface so as to emit an emergency signal and the position of the impact. In this case, the ELT beacon allows to track the potential drift of fragments floating following the streams.

Within the context of the present invention, each device comprises preferably a beacon. However, it could also be contemplated that a device comprises simultaneously two beacons or more.

The device according to this invention could be electrically supplied by the aircraft. However, in a particular embodiment, said device comprises an autonomous source of energy so as to be completely independent.

Furthermore, advantageously:

said beacon could be provided with auxiliary means allowing to aid its localization, when it floats at the surface of the sea water expanse, for instance a dye type marker, a smoke generator or an auxiliary beacon, including of the GPS type; and/or said beacon is mounted in an unpressurized area of the aircraft, located in its upper rear part, in an area that is in principle the least exposed one upon an impact with the ground or with a surface of water.

The present invention also relates to a method for aiding the localization of a wreck of an aircraft submerged in a sea water expanse, said method using at least one beacon being able to emit signals able to be detected remotely and being installed inside the aircraft.

According to the invention, said method is remarkable in that, upon an immersion of the aircraft, said beacon is automatically ejected, floating out of the fuselage of said aircraft, and after said ejection, the emission of said signals is automatically triggered by said beacon.

The present invention further relates to a system for aiding the localization of a wreck of an aircraft submerged in a sea water expanse, comprising:

a device, such as mentioned hereinabove, for emitting, upon an immersion of the aircraft, signals able to be detected remotely; and usual means being able to detect such signals.

The present invention further relates to an aircraft, in particular a transport airplane, being provided with a device such as mentioned hereinabove.

BRIEF DESCRIPTION OF THE DRAWINGS

The FIGS. of the appended drawings will better explain how this invention can be implemented. In these FIGS., like reference numerals relate to like components.

DETAILED DESCRIPTION

Figure 1:
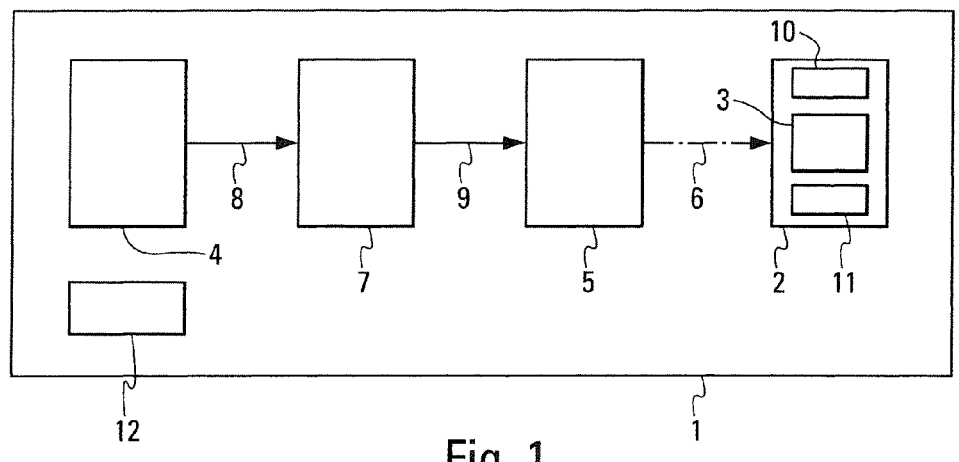
FIG. 1 is the block diagram of a device for aiding the localization according to this invention.

The device 1 according to this invention and schematically shown on FIG. 1 is intended to aid the localization of a wreck of an aircraft AC, in particular of a cargo airplane, being submerged in a sea water expanse (sea or ocean), further to a crash.

To this end; said device 1 comprises at least one beacon 2 comprising a signal emission device 3, adapted to emit signals (as waves) able to be detected remotely, and being installed inside the aircraft AC.

According to the invention, said beacon 2 is implemented so as to be able to float, for instance, being wrapped in an appropriate material, including of the foam type and said device 1 further comprises:

an immersion detection device 4 being able to detect automatically an immersion of the aircraft AC, further to a crash;

an ejection device 5 for ejecting automatically said beacon 2 out of the fuselage of the aircraft AC, upon the detection of an immersion by said immersion detection device 4, as illustrated by a mixed line arrow 6 on FIG. 1;

a control unit 7 that, when it receives a signal of detection of the immersion detection device 4 (via a link 8), sends an ejection order to the ejection device 5 (via a link 9); and a trigger device 10 for automatically triggering said signal emission device 3 so that it emits signals after said ejection.

Figures 2A, 2B, 2C:
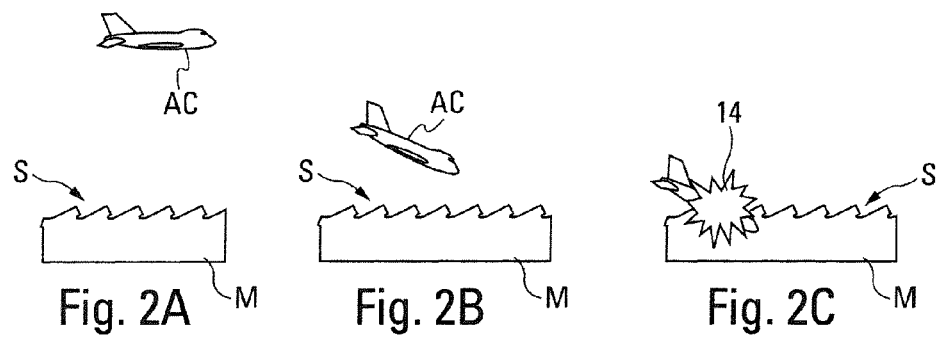
FIGS. 2A to 2E schematically show different successive situations upon a crash of an aircraft and its immersion in a sea water expanse.

On FIGS. 2A to 2E, different successive situations are shown during a flight of an aircraft AC (provided with a device 1 according to this invention), upon which a crash occurs on a sea water expanse (sea or ocean) M. More precisely, on FIG. 2A, the aircraft AC flies normally;

on FIG. 2B, a severe incident or accident has occurred, resulting in the aircraft AC being no longer under control and falling; and on FIG. 2C, the impact (symbol 14) of the aircraft AC is shown on the surface S of the water expanse M.

As, thanks to the invention, upon or just after the impact with the surface S during the immersion phase, the beacon 2 is ejected out of the fuselage of the aircraft AC, and as this beacon 2 is floating, it goes up to the surface S above the wreck of the aircraft AC, allowing to facilitate the detection of the signals it emits then and thus to aid the localization of the wreck. This is shown on FIG. 2D, for a use of two beacons 2a and 2b, in particular for increasing the efficiency.

Within the context of the present invention, each device 1 comprises preferably one beacon 2. However, it could also be contemplated that a device 1 comprises simultaneously two beacons or more.

Figures 2D, 2E:
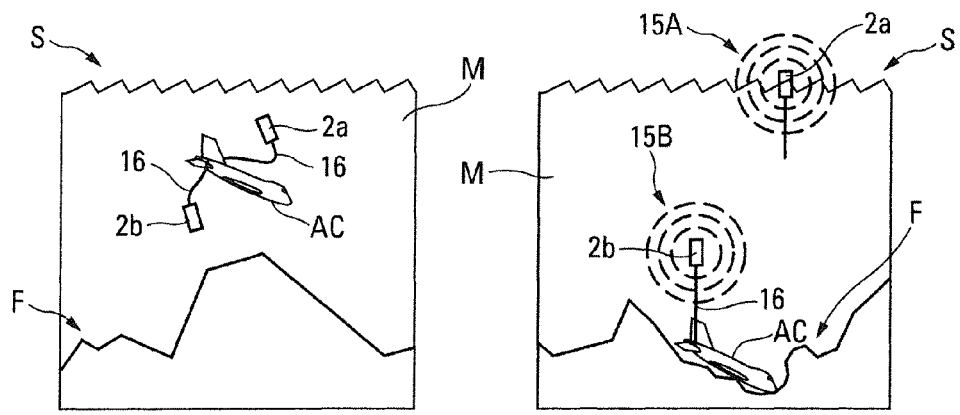

The device 1 according to this invention could be formed so as to completely release one of the beacons of the aircraft AC after its ejection out of the fuselage upon an immersion, so that after its ejection, it goes up directly to the surface S where it could be more easily detected and located, as shown for the beacon 2a on FIG. 2E emitting signals illustrated by a symbol 15A.

Said device 1 could also comprise a link maintenance device 16, preferably cables or halyards, for maintaining the beacon linked to the aircraft, after its ejection out of the fuselage upon an immersion, as shown for the beacon 2b on FIG. 2E emitting signals illustrated by a symbol 15B. Thus, when the aircraft AC lies on the bottom F of the water expanse M, the beacon 2b being always linked to the structure of the aircraft AC floats, above the aircraft AC, at a distance from the latter depending on the length of the ties 16 (or halyard) being used. When the depth at which the aircraft lies is high, releasing the emitting beacon(s) 2 from the bottom of the water expanse, for instance by a few hundreds of meters, allows to strongly enhance the probability of detection, as they are not trapped in the metallic fuselage of the aircraft AC, which significantly decreases the efficiency of the emergency signal, and this more particularly if the fuselage is buried in a free flowing ground or if the local relief is very rough.

Consequently, the device 1 according to this invention is a device for emitting emergency signals (15A, 15B), that is to be installed on the aircraft AC in addition to the already existing devices and allowing to very significantly increase the probability of detection of a wreck submerged as a result of an accident above the sea field.

For implementing the present invention different types of beacons 2 could be used, and including:
- a ULB beacon, allowing to emit an underwater signal, but requiring for its detection the presence of ships (boats or submarines) provided with sounders at a relative vicinity;
- an ELT beacon, only emitting on the surface and allowing for a very accurate record of a geographic position, by means of a COSPAS-SARSAT network it uses as soon as it is triggered.

In a preferred embodiment, for increasing its efficiency, the present invention uses at least two floating beacons 2 being differently implemented. As an example, it could use:
- two UB beacons, at least one of them remains linked to the aircraft AC via a halyard 16, preferably made in an aramid fiber, able to have a length as large as several hundreds of meters. The halyard spreads as the aircraft AC dips in the deep sea, whereas the beacon tends to go up to the surface S as a result of its floatability; or
- one ULB beacon and one ELT beacon. The ULB beacon remains linked to the structure of the aircraft AC, whereas the ELT beacon goes up to the surface S so as to emit the distress signal and the position of the impact, as shown for instance on FIG. 2E. In such a case, the ELT beacon allows to track the potential drift of fragments floating following the streams.

As set forth above, each beacon 2 is preferably part of a device 1 being integral therewith, although it could also be contemplated associating one single device 1 to several beacons 2.

In the case of an embodiment with two beacons ULB (or one ULB beacon and one ELT beacon), if the detection of the beacons 2, and thus of the wreck of the aircraft AC is not implemented in a reasonable period of time, initially defined and set at the time of the installation of the device 1 on board the aircraft AC, typically a few days, the halyard 16 of one, 2a, of the beacons is automatically cut or released, so as to allow the subject beacon 2a to go up to the surface S, as shown on FIG. 2E.

Once at the surface S, a beacon 2, whether it has been released just after the crash or a few days later, is submitted to the influence of ocean streams, of the swell and of the local winds, and will thus drift accordingly with respect to the vertical of the point where the aircraft AC is located. However, the influence of the sea streams, of the swell and of the force of the prevailing winds on the trajectory of a floating object could be estimated with a relative accuracy. Once the beacon 2 recovered and knowing the time elapsed between the accident and the moment where the beacon 2 has been released, it is possible to infer a possible trajectory of the beacon 2 on the surface, and as a result, to locate the theoretical area of the crash. In any event, even if the accurate detection of the location of the wreck is not always possible as a result of the obvious inaccuracy on the trajectory of the floating beacon 2, a much more limited search area could be however determined.

In a particular embodiment, the beacon 2 is provided with an auxiliary localization aid device 11 allowing to aid localization of the beacon 2, as it floats on the surface S of said sea water expanse, for instance a dye type marker, a smoke generator and/or a usual auxiliary beacon, including of the GPS type.

The device 1 according to this invention could be part of a system (not shown) for aiding the localization of a submerged wreck of an aircraft, comprising, in addition to said device 1 intended for emitting upon an immersion signals able to be detected remotely, usual means (not shown) being able to detect such signals. In particular, the detection of the beacons of the ULB type by rescue teams operating on the area of the crash, could be implemented with the help of searching means usually used for the detection of flight recorders.

Furthermore, the immersion detection device 4 and the ejection device 5 of the device 1 being intended, more specifically, for automatically detecting an immersion of the aircraft AC could be connected to an electric circuit of the aircraft AC. In this case, the ejection of the beacons 2 and the triggering of their emission are controlled by a signal issued from the aircraft AC, on the condition that the aircraft AC is still able to send such a signal.

Thus, in a particular embodiment, said device 1 comprises an autonomous source of energy 12 so as to be completely independent. Thus, said device 1 has its own source of energy, the immersion detection device 4 for detecting the crash, as well as the control unit 7 allowing various sequences to be triggered: ejection of the beacons, emission start, cut of the halyard 16 after a certain period of time.

Within the context of the present invention, the immersion detection device 4 could implement the detection of the immersion (further to the crash) in various ways, for instance by processing, by a comparing device, measured parameters received by a measuring device, such as a shock or a sudden deceleration, the general attitude of the aircraft AC or still the altitude (used combined with other parameters). However, the most relevant parameter to be used is the surrounding pressure linked to the immersion of the aircraft AC.

In the case of a triggering through the hydrostatic pressure, the ejection device 5 for ejecting the beacon 2 could be triggered if the pressure measured by the measuring device exceeds 6 bars, corresponding to an immersion depth of 50 meters approximately.

However, triggering the ejection of the beacon 2 based on two pieces of information (or more) supplied, for instance, by two pressure sensors or by one pressure sensor and one accelerometer, is preferable for safety and reliability reasons.

Furthermore, the ejection device 5 for ejecting the beacon 2 could be implemented in different ways within the context of the present invention. FIGS. 3A to 6C schematically show, as an illustration, different possible embodiments of said ejection device 5.

A beacon 2 could be ejected from the skin 18 of the aircraft AC by the mechanical action of a piston system 20, the motion of which is ensured by an electric engine, a hydraulic or even pneumatic pressurization. However, the most interesting solution, taking into consideration the constraints of reliability, safety, minimum mass, complexity and size, is the use of a gas generator 21 for the pneumatic pressurization of the ejection (or the launching) tube 22, as shown on FIGS. 3A to 6C. This solution allows to have available a very high energy in a very short period of time and with an optimum compactness.

In a particular embodiment, a block of energy material (commonly referred to as solid propergol), generates, burning in a dedicated combustion chamber, a large amount of inert gas, mainly comprising nitrogen, carbonic gas and steam. The combustion chamber communicates with the area to be pressurized via a nozzle sized so that the combustion of the block occurs under a pressure being sufficient for ensuring the production of the necessary amount of gas within the time allowed for the ejection, that is, in a few tens of seconds approximately.

The ejection tube 22 is fastened very rigidly against the skin 18 of the aircraft AC or in the vicinity of the latter, perpendicularly to the internal surface, and preferably in an unpressurized area of the aircraft AC.

Figure 3A:
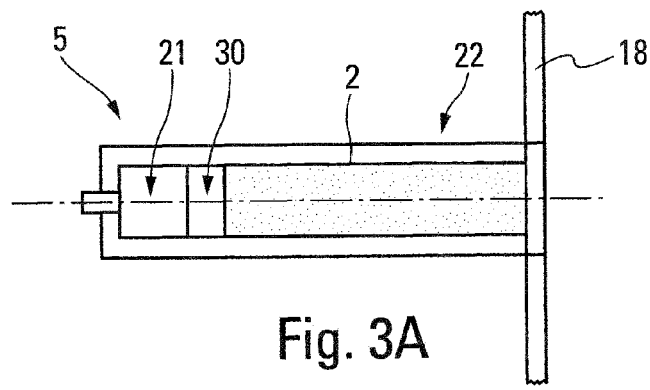
FIGS. 3A to 6C schematically show different embodiments of ejection means of a beacon.
Figure 3B:
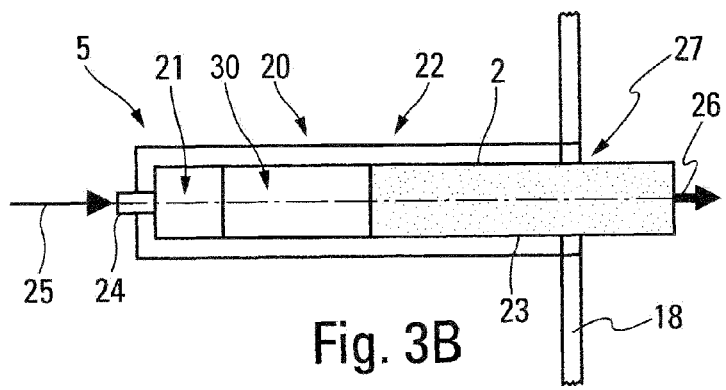
Figure 4:
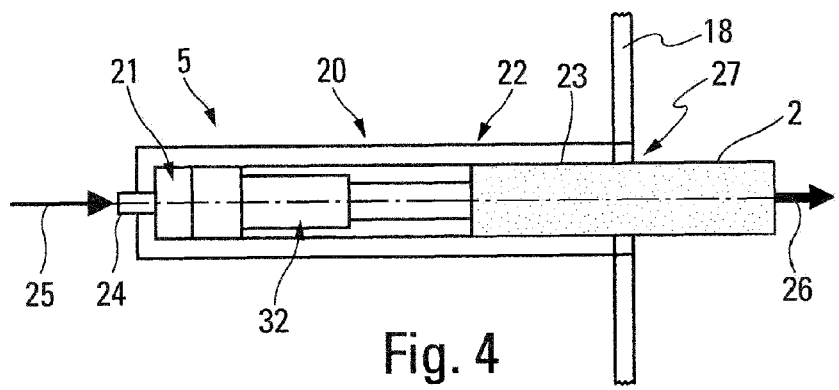
Figure 5:
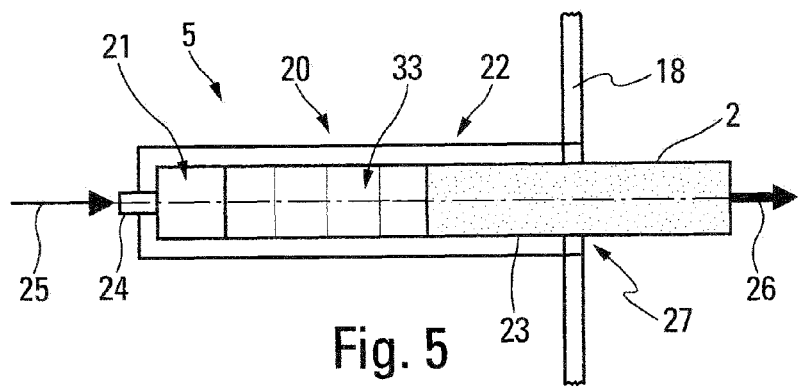

Once electrically initiated with the help of a control interface 24, as illustrated by an arrow 25 on FIGS. 3B, 4 and 5, the combustion of the pyrotechnic block generates a large amount of gas in the ejection tube 22. The pressure of this gas is applied on one of the sides of the piston 23 (containing the beacon 2 to be ejected), allowing the shift of the latter in the ejection tube 22, as illustrated by an arrow 26.

The other side of the piston 23 comprises a plug with an appropriate shape so that the shift of the piston 23 will allow the skin 18 of the aircraft AC to be stamped by this plug, and the piston 23 to go out thru the thus created orifice 27.

Thus, the arrangement of these devices only requires very few modifications, for being installed on board an existing aircraft AC or being defined, limiting the impacts both in term of certification (no significant modification of the structure or of the systems of the aircraft AC) and in term of additional mass, as the overweight supplied by the device 1 is low. As an Illustration:

in the example of FIGS. 3A and 3B, the ejection tube 22 is provided with a combustion chamber 30;
in the example of FIG. 4, the ejection tube 22 is provided with a telescopic jack 32 spreading under the effect of the combustion gases of the block of propergol; and
in the example of FIG. 5, the ejection tube 22 is provided with an inflatable pad (bag) 33 also spreading under the effect of the combustion gases of the block of propergol.

Figure 6A:
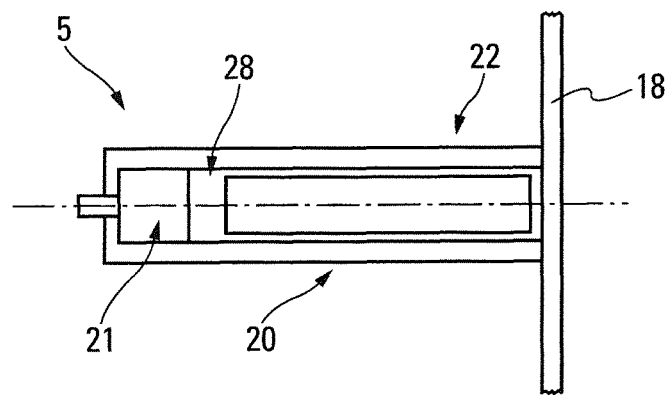
Figure 6B:
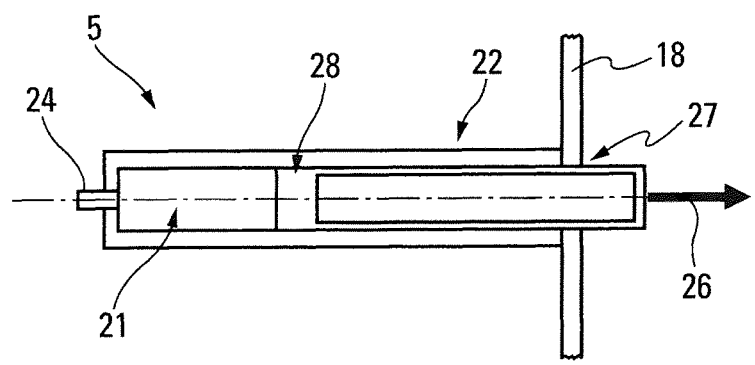
Figure 6C:
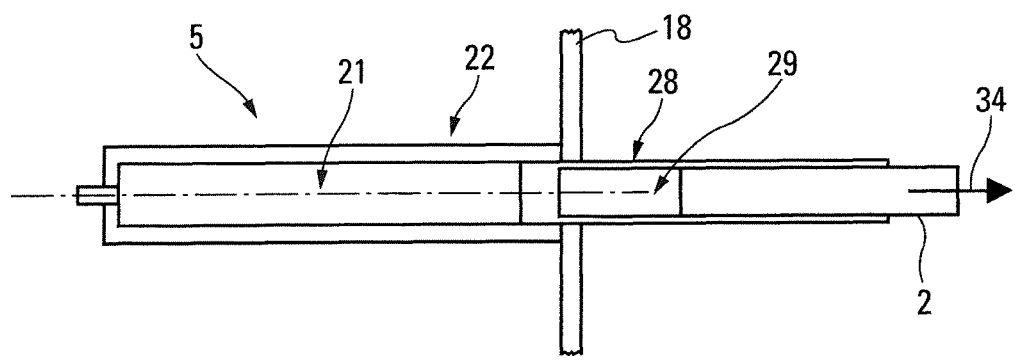

Moreover, in a preferred embodiment, shown on FIGS. 6A, 6B and 6C, the ejection tube 22 of the beacon 2 is preferably provided with a hollow piston 28 comprising a casing 29, wherein the beacon 2 is arranged and, if appropriate, the halyard (not shown), so as, more specifically, to protect the beacon 2 upon the ejection phase.

It is also possible to contemplate installing a hatch (not shown) arranged in the skin 18 of the aircraft AC, allowing the beacon 2 to go through upon the ejection, preventing the skin 18 of the aircraft AC from being perforated and allowing a lighter and simpler ejection system to be used. Opening the hatch could either be controlled at the same time as the ejection of the beacon 2, but by a dedicated system, or occur through a net break under the effect of a piston.

When the piston 28 reaches the end of its stroke, it comes in abutment on the ejection tube by means of a shoulder specifically arranged so as to prevent the piston 28 from being ejecting from the structure of the aircraft AC, as shown on FIG. 6C. Thru an inertia effect, the stamping plug and the beacon 2 are then ejected (arrow 34), simultaneously and separately, outside the aircraft AC. If appropriate, the halyard 16 is unwound as the beacon 2 tends to go up to the surface S as a result of its floatability. The halyard 16 is linked on one side to the beacon 2 and on the other side to the ejection system and thus remains integral with the structure of the aircraft AC.

In another embodiment, and in order to limit the stroke of the piston, it is possible to use a two stage gas generator. The first stage provides the pressurization of the tube for implementing the stamping operation of the skin. Thus, the piston has a stroke smaller by a few centimeters only. Once this cut is implemented, the second stage of the gas generator ensures the pressurization of the interior of the hollow piston and the ejection of the beacon 2.

When the present invention uses two beacons, one of which is released, the second beacon could either remain linked to the aircraft AC, or also be released similarly to the first beacon, with optionally a time interval between the two releases.

In the case where one single beacon is released, the choice of the beacon 2 having the halyard 16 to be cut or released may be made as a result of the design of the beacon 2, that is that one single beacon out of two is provided with a link release device that cuts or releases the halyard. The choice may also be made upon the release only, for instance the beacon having its halyard under tension is released, provided that the halyard is not blocked, but pulled by the beacon. In the blocked beacon case, that beacon is prevented from being released, as the halyard thereof may be jammed by a part of the wreck or by the relief and as a result would not go up to the surface. The adoption of this logics of choice of beacon to be released requires the installation of a system of measurement of the tension of the halyard associated with a calculator able to select the beacon to be released and to send accordingly the signal to the release system for only the relevant beacon.

For releasing the beacon 2, it is preferable that the halyard 16 is cut or released at the level of the ejection device 5 for ejecting the beacon 2 and thus on the side of the wreck of the aircraft AC for lesser complexity reasons, as shown on FIG. 2E for the beacon 2a.

Although a little more complex to implement as a result of the need to introduce at the level of the beacon 2 a link release device that releases the halyard and a dedicated control system, which results in an increase of the mass of the beacon 2 impacting its floatability and its ejection system, the release of the halyard 16 at the level of the beacon 2 is advantageous in that it prevents the halyard 16 from going up with the beacon 2, allowing to eliminate the likelihood of the halyard 16 possibly hitting a part of the wreck of the aircraft AC or a relief.

Within the context of the present invention, the link release device 35, 36 that releases the link maintenance device 16 could use various technologies and be achieved in different ways. In particular, it could comprise:

- a simple hook or ring, having its opening electrically controlled at the end of a preliminarily defined period of time;
- an opening or breaking device based on the chemical attack of a component. An amount of acid, for instance, could be locally released on a component of the fastening system of the halyard 16 upon the ejection of the beacon 2. The chemical attack results, after a certain period of time, in the halyard being released; and
- a pyrotechnic system 35, 36 offering the advantage of a significant reliability.

Figure 7A:
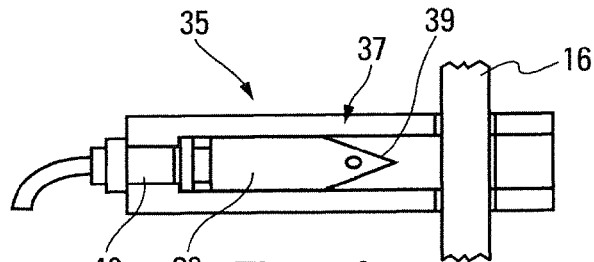
FIGS. 7A and 7B, 8A and 8B schematically show two different embodiments of means for releasing a linking cable.
Figure 7B:
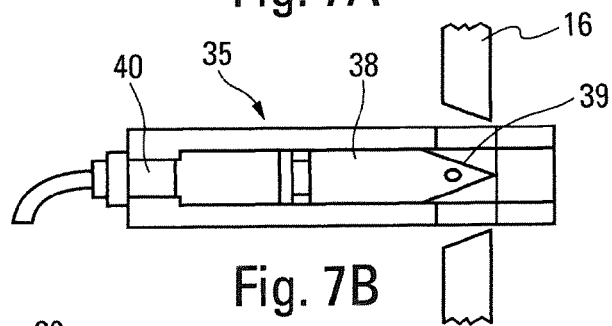
Figure 8A:
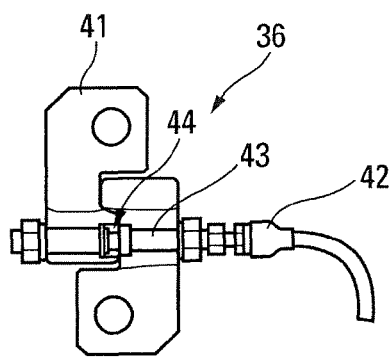
Figure 8B:
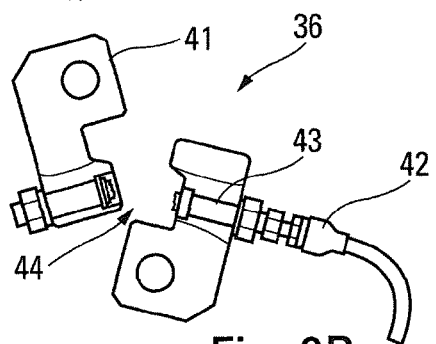

This could be:

- a releasing pyrotechnic system 35 thru a direct cut of the halyard 16, as shown on FIGS. 7A and 7B (respectively showing the situations before and just after the release). This system 35 comprises, more specifically, a hollow body 37 wherein a piston 38 is housed, provided with an appropriate tip 39 allowing to cut the halyard 16, as well as with a usual cartridge 40; or
- a shackle cut release pyrotechnic system 36, as shown on FIGS. 8A and 8B. On these FIGS. 8A and 8B (corresponding respectively to the situations before and just after the release), more specifically a shackle body 41, a cartridge 42, a brace 43, and the break area 44 are shown.

Another possibility comprises providing a dissolving of a part of the tie or of the halyard 16 directly by the sea water.

Naturally, in the case where at least one of the beacons is not linked to the aircraft AC, it goes up directly to the surface after its ejection. In this case, no break system is needed as a result of the absence of a halyard on this beacon.

Furthermore, the device 1 according to this invention is arranged, preferably, in an unpressurized area of the aircraft AC. This is in relation with the fact that mounting the device 1 should occur as close as possible to the skin of the aircraft AC, and the presence of a commercial coating could unnecessarily make its installation even more complex. Moreover, should an inadvertent triggering occur upon a flight, the probability of such an event occurring being extremely low as a result of proven technologies being used, associated with a reliable activation logics, there would not have any depressurization of the cockpit.

Figure 9:
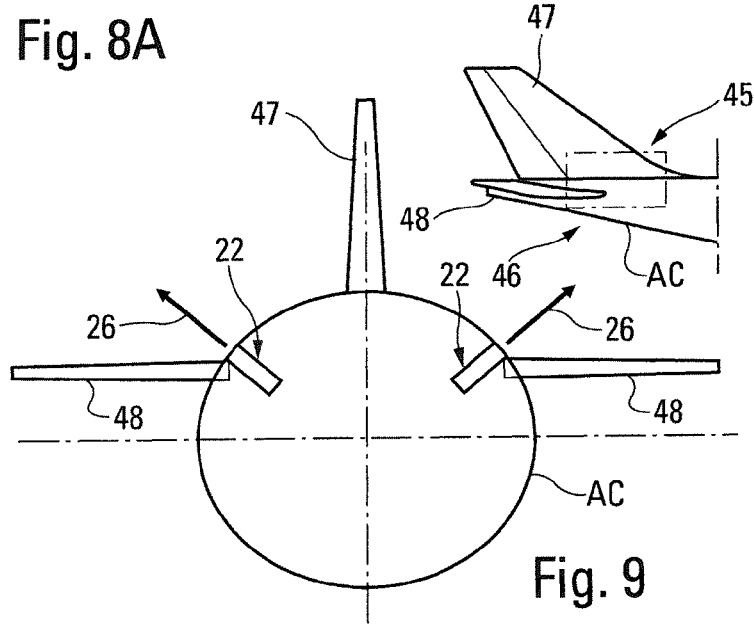
FIG. 9 schematically illustrates a preferred location of a beacon according to this invention on an airplane.

The most appropriate installation area is the rear upper part 45 of the aircraft AC, just after the bulging wall (strong wall) delimiting the end of the pressurized area, as shown on FIG. 9 showing the tail 46 of the aircraft AC, provided with the stabilizer 47 and the horizontal tails 48. This rear extreme area is generally the least damaged after a crash and offers, in nearly all the aircrafts AC, a free space being sufficient for the installation of the device 1 according to the invention. Moreover, the access to this area is easy, for the installation of the device 1 and for possible maintenance operations. In this area is also housed the digital flight data recorder, of the DFDR type, being the flight recorder recording the flight parameters, the other flight recorder being, most often, located before the bulging wall in the pressurized cargo area.

Moreover, the installation of the device 1 according to this invention in the upper part of this unpressurized rear area 45 is preferable for safety reasons. Indeed, should said device 1 inadvertently be triggered on the ground, the beacon 2 would be ejected upward and would have, as a result, a much lower risk for the persons able to progress in the vicinity of the aircraft AC. Moreover, the upward evacuation of the beacons 2 prevents the device 1 from becoming inoperable in case of an emergency sea landing. Indeed, upon a successful sea landing, the deceleration could be insufficient for triggering the ejection, but could submit the lower structure to a deformation, able to block the device in the aircraft AC.

Furthermore, this area has the particularity, on the aircrafts AC with a mobile horizontal plane, to become filled quickly in the case of an immersion, because of the opening present in the rear fuselage for the mobility of the rear plane, allowing the immersion condition to be detected or confirmed.

The invention claimed is:

1. A device for aiding the localization of a wreck of an aircraft submerged in a sea water expanse, said device comprising:
    at least one beacon arranged inside the aircraft that is able to emit signals that are remotely detectable;
    an ejection device that automatically ejects said beacon out of the aircraft upon an immersion of the aircraft in water;
    a trigger device that automatically triggers the emission of said signals after the immersion;
    a link maintenance device that maintains at least one of the beacons, at least temporarily, linked to the aircraft after ejection of the beacon out of the aircraft; and
    a link release device that acts on said link maintenance device so as to completely sever the link between the beacon and the aircraft, thereby enabling the beacon to track the potential draft of fragments following stream currents in the sea water expanse.

2. The device according to claim 1, wherein the at least one beacon further comprises: at least two beacons; and wherein at least two of the beacons are implemented in different ways, such that one beacon remains attached to the aircraft by the link maintenance device and another beacon is severed from connection with the aircraft by the link release device.

3. The device according to claim 1, wherein said beacon comprises an auxiliary localization aid device that aids in the localization of the beacon when the beacon floats at the surface of said sea water expanse.

4. The device according to claim 1, further comprising:
    an immersion detection device that automatically detects an immersion; and
    wherein said ejection device ejects the beacon out of the aircraft upon the detection of an immersion by said immersion detection device.

5. The device according to claim 4, wherein said immersion detection device automatically comprises a measuring device that measures the values of a least one parameter relative to the aircraft or to its environment and a comparing device that compares the measured values to a threshold value, an immersion being detected when the measured values exceed said threshold value.

6. The device according to claim 1, wherein the ejection device comprises:
    an ejection tube having a hollow piston comprising a casing;
    wherein the beacon is housed within said casing; and
    wherein said piston is operatively attached to said ejection tube such that when the piston reaches the end of a stroke the piston comes in abutment with the ejection tube and is prevented from being ejected from the structure of the aircraft and a stamping plug and the beacon are ejected from the aircraft, simultaneously and separately.

7. The device according to claim 1, further comprising:
    an autonomous source of energy connected to the device.

8. The device according to claim 1, wherein said beacon is mounted in an unpressurized area of the aircraft and located in an upper rear part of the aircraft.

9. The device according to claim 1, wherein said ejection device comprises a piston system that generates an opening in the aircraft and expels said beacon out of the aircraft through said opening.

10. The device according to claim 9, wherein the piston system comprises a piston having a plug that stamps a skin of the aircraft to create said opening.

11. A method for aiding the localization of a wreck of an aircraft submerged in a sea water expanse, the method comprising:
arranging at least one beacon inside the aircraft that is able to emit signals that are remotely detectable;
automatically ejecting, by an ejection device upon an immersion of the aircraft in water, the beacon out of the aircraft;
automatically triggering, by a triggering device after the immersion, the emission of the signals by a signal emission device located on the beacon;
maintaining, at least temporarily by a link maintenance device, the beacon linked to the aircraft after ejection of the beacon out of the aircraft; and
severing completely, by a link release device that acts on the link maintenance device, the link between the beacon and the aircraft.

12. The method of claim 11, wherein the ejection device comprises a piston system, and ejecting the beacon out of the aircraft further comprises:
generating an opening in the aircraft; and
expelling the beacon out of the aircraft through the opening.

13. An aircraft comprising a device for aiding the localization of a wreck of an aircraft submerged in a sea water expanse, said device comprising:
at least one beacon arranged inside the aircraft able to emit signals that are remotely detectable;
an ejection device that automatically ejects said beacon out of the aircraft upon an immersion of the aircraft in water;
a trigger device that automatically triggers the emission of said signals after the immersion;
a link maintenance device that maintains at least one of the beacons, at least temporarily, linked to the aircraft after ejection of the beacon out of the aircraft; and
a link release device that acts on said link maintenance device so as to completely sever the link between the beacon and the aircraft, thereby enabling the beacon to track the potential drift of fragments following stream currents in the sea water expanse.

14. The aircraft of claim 13, wherein said ejection device comprises a piston system that generates an opening in the aircraft and expels said beacon out of the aircraft through said opening.

* * * * *